United States Patent [19]

Mouille et al.

[11] 4,392,781

[45] Jul. 12, 1983

[54] HIGH PERFORMANCE BLADE FOR HELICOPTER ROTOR

[75] Inventors: Rene' L. Mouille, Aix-en-Provence; Jacques R. Gallot, Sausset-les-Pins; Jean-Marc E. Pouradier, Port-Saint-Louis-du-Rhone, all of France

[73] Assignee: Societe Nationale Industrielle Aerospatiale, Paris, France

[21] Appl. No.: 243,348

[22] Filed: Mar. 13, 1981

[30] Foreign Application Priority Data

Mar. 25, 1980 [FR] France .............................. 80 06577

[51] Int. Cl.$^3$ .............................................. B64C 27/46
[52] U.S. Cl. .......................... 416/223 R; 416/DIG. 2
[58] Field of Search .......... 416/228 A, 223 R, 237 A, 416/242, DIG. 2, 142, 143

[56] References Cited

U.S. PATENT DOCUMENTS 3,902,821  9/1975  Robinson ............................ 416/242
4,248,572  2/1981  Fradenburgh ....................... 416/242
4,325,675  4/1982  Gallot et al. ..................... 416/223 R Primary Examiner—Harvey C. Hornsby
Assistant Examiner—Arthur D. Dahlberg
Attorney, Agent, or Firm—Merriam, Marshall & Bicknell

[57] ABSTRACT

The present invention relates to a high performance blade for helicopter rotor presenting an aerodynamic surface produced by profiles of which the aerodynamic twist increases from the end profile towards the root profile and is then reversed and becomes zero at the fastenings of the blade. According to the invention, the angle of twist formed by the zero lift chord $C_o$ of a profile of the aerodynamic surface and a reference plane P passing through the center of the fastenings of the blade to the hub of the rotor, is, for the end profile, at the most equal to a value $\theta_1$ of 0.3 degrees. The invention is more particularly applied to the obtaining of rotary wings, for example for helicopters, capable of very high performances, particularly in rapid forward flight under high load.

5 Claims, 7 Drawing Figures

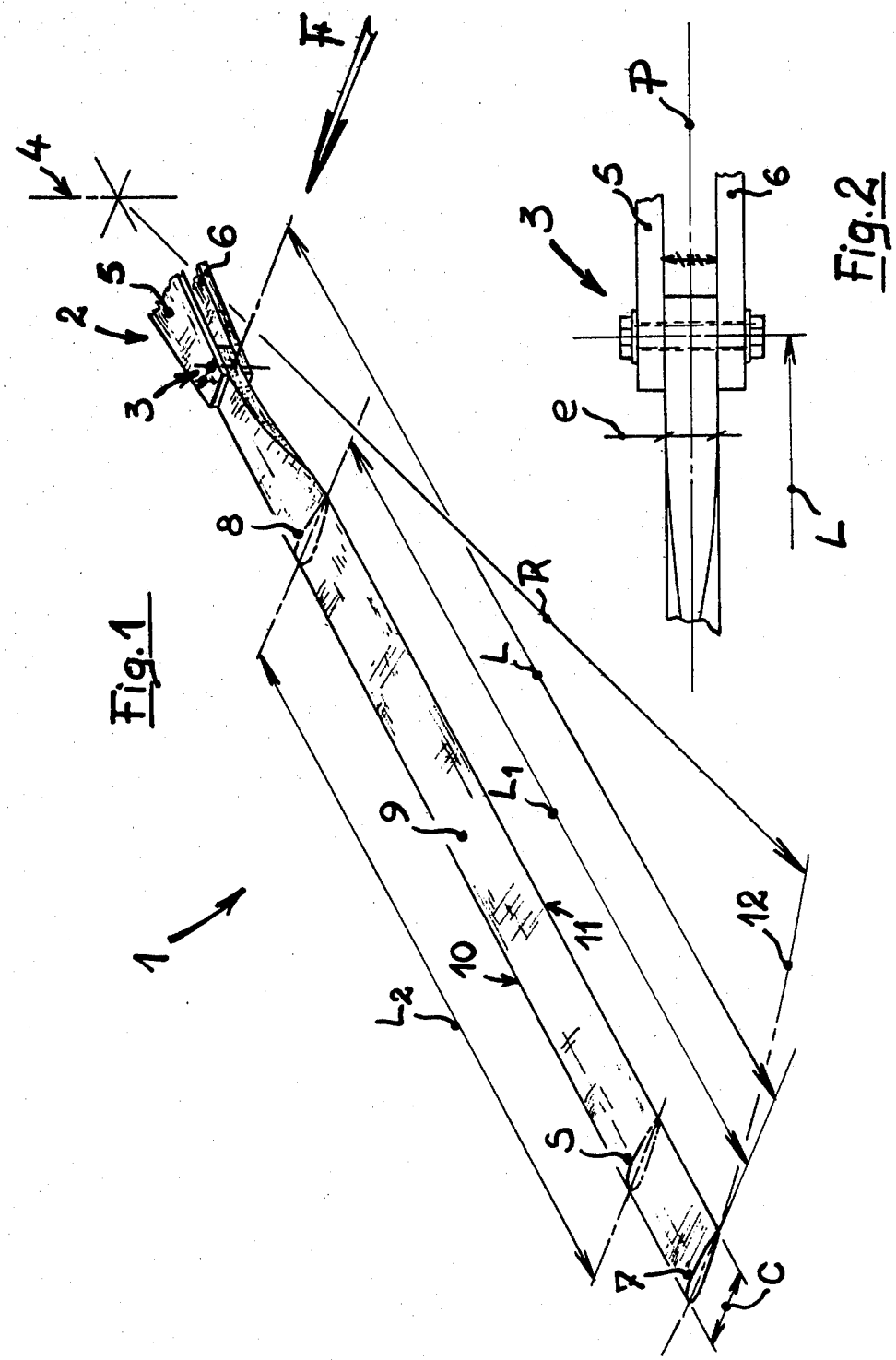

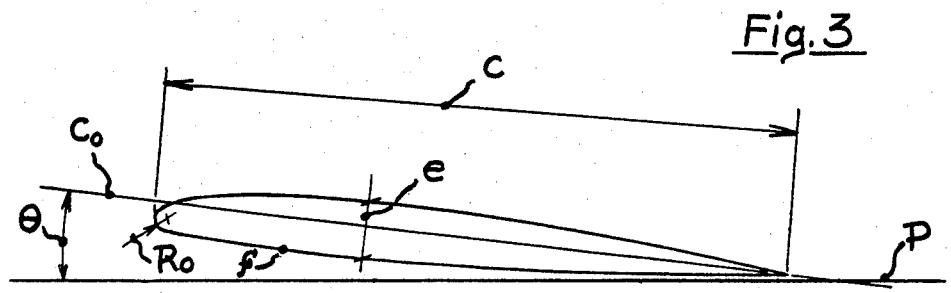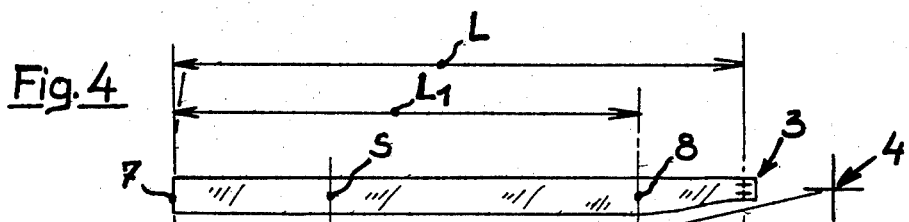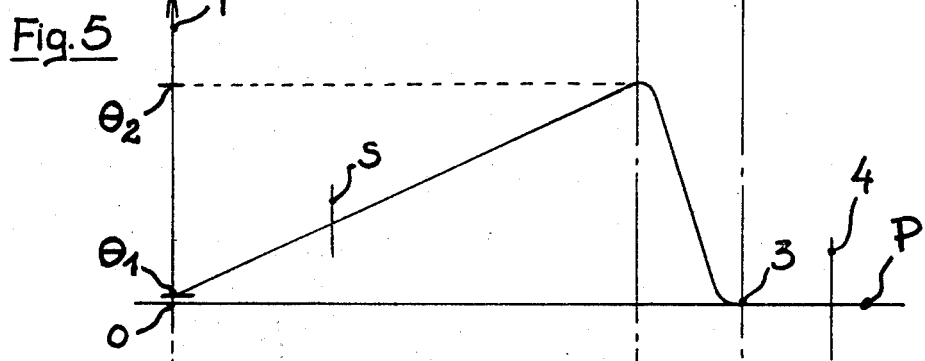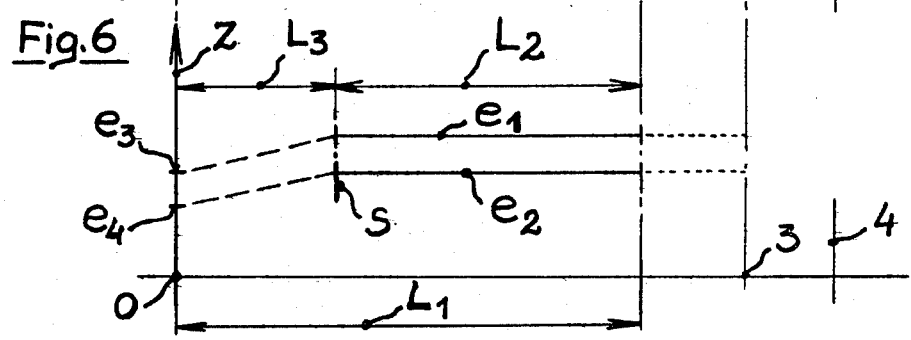

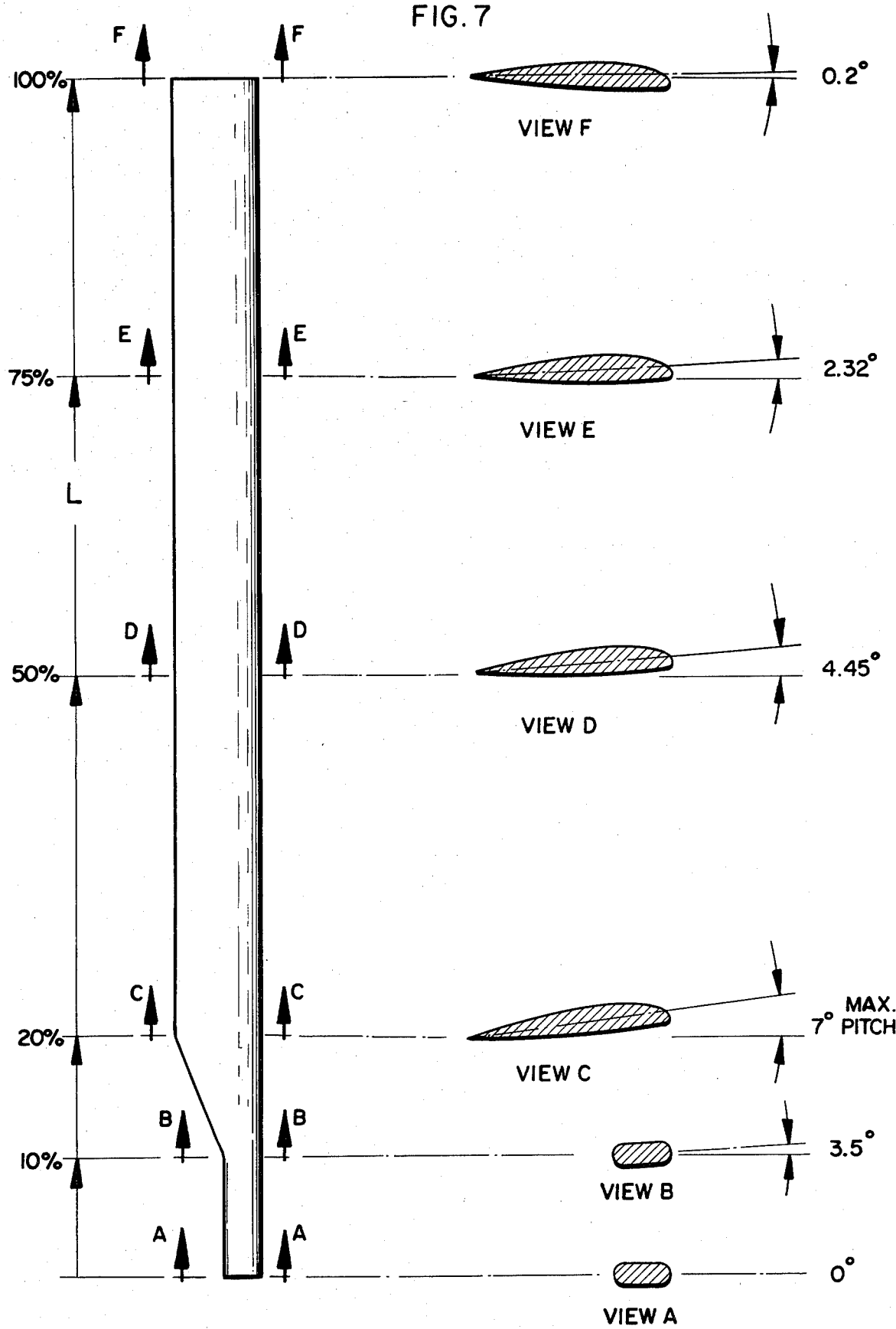

HIGH PERFORMANCE BLADE FOR HELICOPTER ROTOR

The present invention relates to rotary wings of aircraft, and more particularly, to a high-performance blade for helicopter rotor.

A helicopter rotor blade is known to function essentially in two positions in the course of its circular path, viz. an advancing position where the blade coming from the rear of the helicopter describes, towards the front, an arc of circle of 180° and a returning position where the blade, continuing its movement, returns to its initial position after a complete rotation through 360°.

It is also known that the aerodynamic phenomena encountered in the course of functioning differ depending on the position of the blade.

Thus, the advancing blade is subjected at its end to effects of compressibility of the air which provoke, for example, for a certain combination of the speed of advance of the apparatus with the speed of rotation of the rotor, a rapid increase in the drag, whilst the returning blade is subject to stall due to its high aerodynamic setting.

To remedy these drawbacks and to increase the range of use of helicopters, it is known, for example, to reduce the maximum relative thickness of the end profile and to choose for all the blades of the rotor a twist and adjustment of the pitch, tending to diminish the aerodynamic setting of the active part of the returning blade.

Another solution, which may be combined with the preceding solutions, is to define a family of profiles which is particularly well adapted to allow on the one hand the greatest possible drag divergence Mach number to be obtained at the end of a blade and, on the other hand, to ensure for the returning blade a pressure distribution avoiding the premature appearance of the loss of lift.

In U.S. Patent Application Ser. No. 100,350 filed on Dec. 5, 1979, now U.S. Pat. No. 4,325,675, there is described a blade profile for rotary wings of aircraft, capable of very high performances whilst hovering, in high speed flight and in flight manoeuvres.

The geometry of this profile, marked in particular by the presence of a particular leading edge radius, a point of minimum curvature on the lower surface, and generally by an original evolution of the curvature about said profile, particularly gives the latter a remarkable value for the drag divergence Mach number, and high aerodynamic efficiency.

Moreover, due to the application of the simple geometrical laws of conversion, said profile makes it possible to define, according to the span of the blade and particularly in the end zone, other profiles capable of complying with the requirements of the various types of aerodynamic functioning.

However. these isolated definitions of profiles cannot take into consideration all the aerodynamic effects coming from the interactions, on the one hand, between the different profiles along the span, on the other hand, between the blades during their rotation.

In fact, the design of a profile, considered as undeformable when it was studied, differs particularly from the design of a deformable blade, evolving in eddy flows.

It is therefore an object of the present invention to define a blade for helicopter rotor capable of very high performances in advancing position and in returning position.

This blade, defined by the evolution and adaptation along its span of the aerodynamic profile cited hereinabove and, more precisely, by the evolution of the twist and the maximum relative thickness of said profile, makes it possible in particular to obtain noteworthy performances at high speed under heavy load.

Apart from the optimal compromise made for relative functioning of the profiles along the active surface of the blade, the root zone located near the rotor makes it possible to obtain a beneficial effect on the drag, as well as on the mechanical efforts acting on the device for fastening the blade to the hub of the rotor.

To this end, according to the invention, a high performance blade for helicopter rotor, comprising an end profile disposed perpendicularly to the leading edge of the blade and a root profile placed between said end profile and the fastenings of the blade to the hub of the rotor, said end profile and said root profile defining along the major part of the span of the blade an aerodynamic surface produced by profiles of substantially constant chord and each presenting, on the one hand, a radius of maximum curvature Ro at the leading edge defined approximately by the expression $Ro = 1.7 \, C \cdot e^2_{max}$, in which C represents the chord and $e_{max}$ the maximum relative thickness of the profile in question, on the other hand, a point of minimum curvature positioned on the lower surface at a distance from the leading edge approximately equal to 20% of the length of the chord of said profile, said profile of said aerodynamic surface furthermore having, from the end profile and towards the root profile, an aerodynamic twist increasing linearly and substantially up to the section of blade where said root profile is defined, said twist then being reversed to become zero at the fastenings of the blade, said blade being characterised in that the angle of twist formed by the zero lift chord of a profile of said aerodynamic surface and a plane of reference passing through the centre of the fastenings of the blade to the hub of the rotor is, for the end profile, at the most equal to 0.3 degrees.

Thus, due in particular to this upper limit of twist between the two end parts of the blade and the combined use of a linear twist increasing between the end profile and the root profile, the invention makes it possible to define, for a family of profiles, a blade with a very high propulsive and carrying yield.

The difference between the angle of twist of the root profile and the angle of twist of the end profile is preferably at least equal to 6.0° and at the most equal to 8°, the distance separating said end profile from said root profile being at leat equal to 70% of the length of the blade.

Furthermore, to optimize the lift of the blade without excessively increasing the drag, it is advantageous if the maximum relative thickness of the root profile is at least equal to 9% and at the most equal to 13% of the length of the chord of said roof profile and if said maximum relative thickness is maintained constant, towards the end profile, over a distance at least equal to 52% of the length of the span of the blade.

Similarly, to optimize the drag, particularly towards the end of the blade, ensuring satisfactory lift and an excellent structural resistance, it is advantageous on the one hand if the maximum relative thickness of the end profile is at least equal to 6% and at the most equal to 9% of the length of the chord of the end profile, on the other hand if, over a distance at the most equal to 30% of the length of the span of the blade, the maximum relative thickness of the profiles of the aerodynamic surface increases linearly from said end profile, where the maximum relative thickness is minimum, up to the section of blade where the maximum relative thickness becomes constant and maximum.

According to a preferred embodiment, a high performance blade for helicopter rotor, comprising an end profile disposed perpendicularly to the leading edge of the blade and a root profile placed between said end profile and the fastenings of the blade to the hub of the rotor, said end profile and said root profile defining along the major part of the span of the blade an aerodynamic surface produced by profiles of substantially constant chord and each presenting, on the one hand, a maximum radius of curvature Ro at the leading edge defined approximately by the expression $Ro = 1.7\ C.e^2_{max}$, in which C represents the chord and $e_{max}$ the maximum relative thickness of the profile in question, on the other hand, a point of minimum curvature positioned on the lower surface at a distance from the leading edge approximately equal to 20% of the length of the chord of said profile in question, said profiles of said aerodynamic surface having, furthermore, from the end profile and towards the root profile, an aerodynamic twist increasing linearly and substantially up to the section of blade where said root profile is defined, said twist then being reversed to become zero at the fastenings of the blade, said blade being characterised in that the angle of twist formed by the zero lift chord of a profile of said aerodynamic surface and a plane of reference passing through the centre of the fastenings of the blade to the hub of the rotor is, for the end profile, approximately equal to 0.2 degrees, said end profile having, in addition, on the one hand, a maximum relative thickness equal to about 7% of the length of its chord, on the other hand a difference of twist with respect to the root profile equal to about 7°, the distance separating said end profile from said root profile being approximately equal to 80% of the length of the span of the blade, and in that the maximum relative thickness of the root profile is approximately equal to 12% of the length of its chord, said relative thickness being maintained constant over a distance approximately equel to 57% of the length of the blade, decreasing thereafter linearly towards the end profile.

Thus, any rotary wing of an aircraft comprising at least two blades and characterised in that at least a part of each of the blades is defined by aerodynamic profiles presenting the evolutions of angle of twist and of maximum relative thickness as specified hereinabove, makes it possible to give noteworthy performances in the main types of flight, particularly for rapid forward flight.

The invention will be more readily understood on reading the following description with reference to the accompanying drawings, in which:

FIG. 1 shows a simplified view in perspective of a blade according to the invention.

FIG. 2 shows in the direction of arrow F of FIG. 1, a schematic view of the fastening of the blade to the hub of the rotor.

FIG. 3 defines the aerodynamic setting of a profile of the blade according to the invention.

FIG. 4 shows a simplified plan view of the blade according to the invention.

FIG. 5 indicates, with respect to a reference axis OY, the evolution in span of the angle of aerodynamic twist of the profiles of the blade according to the invention.

FIG. 6 indicates, with respect to a reference axis OZ, the evolution in span of the maximum relative thickness of the profiles of the blade of the invention.

FIG. 7 is a diagramatic plan view of a preferred embodiment of the invention with sectional views of the blade at various points along its length, showing the angle of twist of the section at each point relative to the inboard end of the blade.

Referring now to the drawings, FIG. 1 shows a blade according to the invention which is fixed by means of the rotor 2 of a helicopter, via a fastening device 3. In order to simplify the specification, the rotor and its hub, which do not form part of the subject matter of the invention, have simply been shown schematically by the axis of the rotor 4 and by upper and lower elements 5 and 6 respectively for fastening to the hub.

The blade, of which the chord is substantially constant over the major part of the length of its span L, comprises between its end profile 7 and its root profile 8, an aerodynamic surface 9 limited towards the front by a leading edge line 10 and towards the rear by a trailing edge line 11.

The end profile 7, located at a distance R from the axis of the rotor 4, i.e. on the outer radius R of the rotor disc 12, is preferably placed perpendicularly to the leading edge of the blade 10, whilst the root profile 8, placed between said end profile and the fastenings of the blade 3 by means of the rotor 2, is located at a distance $L_1$ from said end profile.

From the end profile and up to the root profile, the aerodynamic surface 9 is produced by profiles presenting in particular, as indicated in FIG. 3, a radius of maximum curvature Ro at the leading edge and a point of minimum curvature on the lower surface f, positioned at a distance from the leading edge approximately equal to 20% of the length of the chord C.

According to the mathematical definitions given in above-mentioned U.S. Pat. No. 4,325,675, which determine the contour of a profile completely, the radius Ro is defined approximately by the expression $Ro = 1.7\ C.^2_{max}$ in which C represents the chord and $e_{max}$ the maximum relative thickness of the profile in question in the length of span $L_1$.

The aerodynamic functioning of the blade depends in particular on the setting of angle of attack or twist of the profiles along its span.

FIGS. 2 and 3 show how the aerodynamic setting of a profile of the surface 9 with respect to a plane of reference P passing through the centre of the fastenings 3 of the blade to the jub of the rotor, is defined. The aerodynamic angle of attack of a profile may in fact be defined by an angle included between the zero lift chord Co of the profile in question and the plane of reference P mentioned hereinabove.

To allow the profiles of the aerodynamic surface 9 to produce stable pressure distributions for all types of flight, by avoiding in particular in the leading edge zone of the end of the blade, the appearance of high excess speed peaks with steep edge, the angle of aerodynamic twist increases linearly from the end profile 7 and towards the root profile 8.

Moreover, with a view to optimize, for said profiles, this evolution of the angle of twist the difference between the angle of twist $\theta_2$ of the root profile and the angle of twist $\theta_1$ of the end profile is at least equal to 6° and at the most equal to 8°, for a distance $L_1$ separating these two profiles at least equal to 70% of the length L of the blade, included, as indicated for example by FIG. 4, between the profile 7 and the fastenings 3.

As indicated in FIG. 5, the angle of aerodynamic twist in span, which span is located with respect to a reference axis OY placed at the level of the end profile and perpendicular to the reference plane P, increases linearly from the value $\theta_1$ up to value $\theta_2$ of the root profile and is then reversed and becomes zero at the fastenings 3 of the blade.

This reverse of the angle of twist in a root zone of length equal to the difference between, on the one hand, the length of the blade and, on the other hand, the length $L_1$ of the aerodynamic surface defined by the end and root profiles, makes it possible, in particular, due to the advantageous aerodynamic setting of the end profile 7 with respect to the fastenings 3, which is at the most equal to 0.3 degrees, to obtain beneficial effects on the aerodynamism and the mechanical forces encountered in this zone.

For example, the reverse of the twist promotes the reduction in the drag of the blade in the root zone and mainly when the blade is in advancing position. Moreover, when using in the rotor hub a spherical stop (not shown) working by deformation of elastic materials and adapted, in particular, to ensure variation of pitch, the reverse of the twist allows a quasi-symmetrical functioning of the stop about its rest position, i.e. at plane P level, this ensuring an increased lift for the whole of the rotor.

The variation in twist of the blade in a preferred embodiment thereof is further illustrated in FIG. 7. As shown, with reference to a plane passing through the inboard end of the blade (section A), the twist of the blade increases linearly from section A through section B to a maximum pitch of 7° at section C, which is the root profile of the blade and is located at a distance of 20% from the inboard end or 80% from the outer end of the blade. From the maximum pitch at section C, the pitch of the blade then decreases linearly through section D (4.45°) and section E (2.32°) to the outer profile at section F which has a twist of 0.2°.

The evolution of the maximum relative thickness of the profiles, along the span of the aerodynamic surface, also plays an essential role on the aerodynamic characteristics of the blade.

For example, for flight manoeuvres, the distribution of the thicknesses must allow a high lift coefficient to be obtained without producing, in rapid forward flight, a high drag coefficient.

Moreover, when hovering, it is necessary to have a high aerodynamic efficiency to give a high lift yield.

As shown in FIGS. 3 and 6, the evolution of the maximum relative thickness $e_{max}$ of the profiles in the length $L_1$ separating the end profile from the root profile, is located with the aid of a reference axis OZ placed, by way of example, at end profile level.

FIG. 6 shows more precisely that, over a distance $L_2$, the maximum relative thickness is constant from the root profile towards the end profile, being at least equal to a value $e_2$ or at the most equal to a value $e_1$.

To allow the profiles located in length $L_2$ to create, in combination with the aerodynamic twist flows capable of producing pressure distribution determining in particular a considerable lift and high aerodynamic efficiency, the maximum relative thickness of the root profile is advantageously at least equal to a value $e_2$ of 9%, and at the most equal to a value $e_1$ of 13% of the length of its chord, these values being maintained constant over at least 52% of the length of the span L of the blade, i.e. in the whole length $L_2$.

Furthermore, with a view to progressively increasing towards the end profile the value of the drag divergence Mach number, as well as the aerodynamic efficiency of the profiles, the maximum relative thickness of said end profile is at least equal to a value $e_4$ of 6% and at the most equal to a value $e_3$ of 9% of the length of its chord. As shown in FIG. 6, the values $e_4$ and $e_3$ increase linearly over a span length $L_3$ up to the section of blade S where the maximum relative thickness becomes equal to one of the values $e_2$ or $e_1$, i.e. up to the moment when the maximum relative thickness of the profiles becomes constant and maximum.

The distance $L_3$ is avantageously taken at the most to be equal to 30% of the length of the span L of the blade.

According to a preferred embodiment, the combined use, on the one hand, of profiles presenting in particular a leading edge radius Ro and a point of minimum curvature on the lower surface as specified hereinabove, and on the other hand, of a law of twist and a distribution of maximum relative thicknesses particular to these profiles, makes it possible to obtain a geometric optimization of the blade, particularly for high speed flight under heavy load.

According to this preferred embodiment, the angle of twist formed by the zero lift chord of the end profile with the reference plane passing through the centre of the fastenings of the blade to the hub of the rotor, is approximately equal to 0.2 degrees, said end profile furthermore having, on the one hand, a maximum relative thickness approximately equal to 7% of the length of its chord, and on the other hand, a twist difference with respect to the root profile approximately equal to 7°, the distance separating said end profile from said root profile being furthermore approximately equal to 80% of the length of the span L of the blade.

Moreover, in this preferred embodiment, the maximum relative thickness of the root profile is taken to be equel to 12% of the length of its chord, said thickness being maintained constant over a distance approximately equal to 57% of the length L of the blade, and then decreasing linearly towards the end profile.

Comparative tests made for an apparatus equipped, on the one hand, with blades presenting substantially the characteristics of the invention, on the other hand, with a conventional rotor using NACA 0012 profiles for its blades, have given remarkable results.

For example, a comparison of the lifting efficiency shows that the blade according to the invention allows, at equal power, an increase of 5 to 8% of the useful load of the helicopter.

Moreover, a considerable gain on the specific fuel consumption at best range cruising speed, as well as an increased aerodynamic efficiency and an excellent vibratory level, have been observed.

These results translate an excellent adaptation of the profiles along the span of the blade, particularly of the evolution of the twist and the maximum relative thicknesses of said profiles, enabling the invention to find application in all types of rotary wings for aircraft, for example for helicopters.

What is claimed is:

1. A high performance blade for a helicopter rotor having a hub, comprising:
at one end of said blade, an end profile disposed perpendicularly to the leading edge of the blade;

at the other end of said blade, means for fastening said blade to said hub;

a root profile located between said end profile and said other end, said end profile and said root profile defining along the major part of the span of the blade an aerodynamic surface produced by profiles of substantially constant chord, each profile having a radius of maximum curvature Ro at the leading edge defined approximately by the expression $Ro = 1.7\ Ce^2_{max}$, in which C represents the chord and $e_{max}$ the maximum relative thickness of the profile, and a point of minimum curvature positioned on the lower surface at a distance from the leading edge approximately equal to 20% of the length of the chord of said profile, said aerodynamic surface having an aerodynamic twist which increases linearly from said end profile to a maximum at said root profile, said twist then being reversed to become zero at said opposite end of the blade, the angle of twist formed by a zero lift chord of the end profile of said aerodynamic surface and a plane of reference passing through the centre of the hub of the rotor being positive and not more than 0.3 degrees, the difference between the angles of twist of the root profile and of the end profile being 6°–8°, and the distance separating said end profile from said root profile being at least equal to 70% of the length of the blade.

2. The blade of claim 1, wherein the maximum relative thickness of the root profile is at least equal to 9% and at the most equal to 13% of the length of the chord of said root profile and said maximum relative thickness is maintained constant, towards the end profile, over a distance at least equal to 52% of the length of the span of the blade 3. The blade of one of claims 1 to 2, wherein the maximum relative thickness of the end profile is at least equal to 6% and at the most equal to 9% of the length of the chord of the end profile.

4. The blade of claim 3, wherein over a distance at the most equal to 30% of the length of the span of the blade, the maximum relative thickness of the profiles of the aerodynamic surface increases linearly from said end profile, where the maximum relative thickness is minimum, up to the section of blade where the maximum relative thickness becomes constant and maximum.

5. A high performance blade for a helicopter rotor having a hub, comprising:

an end profile at one end of said blade disposed perpendicularly to the leading edge of the blade and a root profile located between said end profile and the other end of said blade, said end profile and said root profile defining along the major part of the length of the blade an aerodynamic surface produced by profiles of substantially constant chord, each profile having a maximum radius of curvature Ro at the leading edge defined approximately by the expression $Ro = 1.7\ C.e^2_{max'}$, in which C represents the chord and $e_{max}$ the maximum relative thickness of the profile and a point of minimum curvature positioned on the lower surface at a distance from the leading edge approximately equal to 20% of the length of the chord, said aerodynamic surface having an aerodynamic twist which increases linearly from the end profile to a maximum at said root profile, said twist then being reversed to become zero at said other end, the angle of twist formed by a zero lift chord of a profile of said aerodynamic surface and a plane of reference passing through the centre of the hub of the rotor is, for the end profile, approximately equal to 0.2 degrees, said end profile having a maximum relative thickness equal to about 7% of the length of its chord, and a difference of twist with respect to the root profile equal to about 7°, the distance separating said end profile from said root profile being approximately equal to 80° of the length of the span of the blade, and the maximum relative thickness of the roof profile being approximately equal to 12% of the length of its chord, said relative thickness being maintained constant over a distance approximately equal to 57% of the length of the blade, and decreasing thereafter linearly towards the end profile.

* * * * *

UNITED STATES PATENT AND TRADEMARK OFFICE
CERTIFICATE OF CORRECTION

PATENT NO. : 4,392,781
DATED : July 12, 1983
INVENTOR(S) : RENE L. MOUILLE ET AL.

It is certified that error appears in the above-identified patent and that said Letters Patent are hereby corrected as shown below:

Col. 2, line 51, "60°" should be --6°--.

Col. 2, line 58, "roof profile" should be --root profile--.

Signed and Sealed this

Third Day of January 1984

[SEAL]

Attest:

GERALD J. MOSSINGHOFF

Attesting Officer    Commissioner of Patents and Trademarks